United States Patent [19]

Spisz

[11] 4,189,078

[45] Feb. 19, 1980

[54] PAPER TRACTOR LOCKING APPARATUS

[75] Inventor: Albert S. Spisz, Livonia, Mich.

[73] Assignee: Burroughs Corporation, Detroit, Mich.

[21] Appl. No.: 887,743

[22] Filed: Mar. 17, 1978

[51] Int. Cl.[2] .......... G03B 1/30

[52] U.S. Cl. .......... 226/74; 226/179; 400/616.1

[58] Field of Search .......... 226/79, 179, 75, 74; 269/59; 400/616, 616.1, 616.2

[56] References Cited

U.S. PATENT DOCUMENTS

| | | | |
|---|---|---|---|
| 3,317,102 | 5/1967 | Lizotte | 226/75 |
| 3,693,856 | 9/1972 | Funk | 226/79 X |

*Primary Examiner*—Allen N. Knowles
*Attorney, Agent, or Firm*—Kenneth J. Cooper; Carl Fissell, Jr.; Kevin R. Peterson

[57] ABSTRACT

A mechanism is provided for securing a paper driving tractor device along a relatively thin elongate member effective in the released condition to permit the tractor to be positioned at will along said elongate member while in the locked condition enabling, positive, secured, engagement of the tractor with said elongate member effective to prevent any movement of the tractor relative to said member, also permitting locking an elongate member repeatedly at the same position without affecting the original characteristics of the elongate member.

6 Claims, 4 Drawing Figures

PAPER TRACTOR LOCKING APPARATUS

BACKGROUND OF THE INVENTION

1. Field of the Invention

The invention relates to paper drive apparatus generally referred to as a paper drive tractor and more specifically to locking means operably associated with such paper drive tractor apparatus for securing or immobilizing the drive tractor in a pre-set position relative to an associated tractor and/or the fanfold paper with which it is to be utilized.

2. Prior Art

Fanfolded paper utilized with machine data processing apparatus, particularly printers and stackers, carry parallel edge perforations which are engageable by solid projecting elements carried by driving units called "tractors". Such tractors are generally positioned on opposite sides of the fanfolded sheet of paper so that the driving elements of the tractor project into and through the perforations of the paper. As the tractor is energized or cycled, the projecting elements, usually carried on belts driving by wheels from a main drive of the associated data processor, are caused to push or pull the paper across the print head and/or into a stacking bin as the case may be.

Such tractors must be movable laterally so as to accommodate the drive to various widths of fanfolded paper. Also the tractor must be capable of being fixedly secured in position once the width has been adjusted for.

In certain types of apparatus it is more efficient and convenient to adjust only one of two tractor devices, the other tractor remaining fixed in a preadjusted position. Various types of locking devices have been proposed and employed in the past, each more or less specialized for the specific application under consideration. Each type has had its own limitations and no one type fills are requirements.

The presently disclosed tractor locking apparatus permits the tractor to be employed in an environment wherein it is desired to have one tractor remain fixed in position while the oppositely disposed tractor is movable so as to accommodate various widths of fanfolded paper. Although the locking apparatus conceivably could be employed on both tractors making any position available for either tractor, the locking element of the present invention is quick, sure, simple and efficient and relatively inexpensive to fabricate. And, by virtue of the novel mechanical arrangement, the present invention provides a quick release and securement position.

SUMMARY OF THE INVENTION

The locking device of the present invention comprises an irregularly shaped mounting plate adapted to be secured to the side of a paper drive tractor. A movable lever is pivotally disposed on the mounting plate, one end of which includes a handle portion while the opposite end is arcuately tapered or shaped to engage a spring biased cylindrical plunger the latter being receivable in a bushing extending horizontally through the mounting plate. An elongated guide element passes through the bushing and is attached at its opposite ends to the main frame of the associate machine hardware. The bottom of this cylindrical receptacle for the plunger is provided with a slight radius such that rocking movement of the hand lever depresses the plunger causing the guide element to be slightly bowed within the bushing effectively captivating the elongated element thereby preventing movement of the tractor along the element.

DETAILED DESCRIPTION OF THE INVENTION

Figure 1:
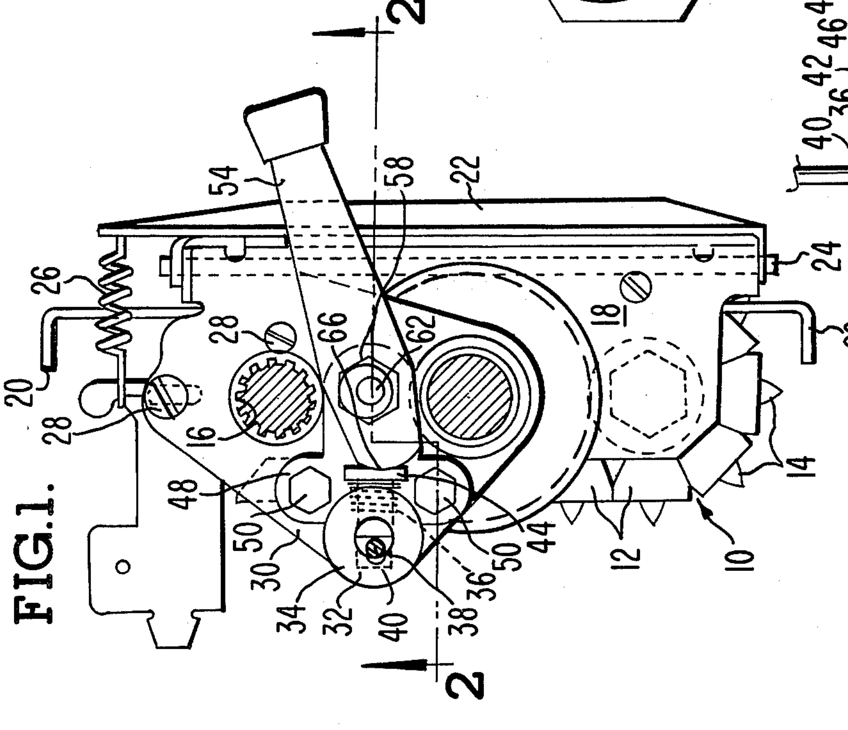
FIG. 1 is a side elevational view of a tractor apparatus employing the present invention.

Referring first to FIG. 1, there is shown a tractor drive mechanism 10 including an segmented drive belt 12 carrying cone-shaped pins 14 the latter being adapted to engage the edge perforations of fanfolded paper (not shown) with which the tractor is most usually employed. The splined hub 16 of tractor drive 10 extends through the tractor body 18 for engagement with the castellations of a splined drive shaft (not shown). Attachment member 20—20 at either end of the tractor body 18 permit the tractor 10 to be mounted and dismounted for cleaning, repair and/or replacement as needed. Cover member 22 pivotally mounted to the tractor body 18, as by pivot hinge 24, is provided with an over center spring 26 permitting the cover to be opened (raised) or closed (lowered) by the operator for positioning of the fanfolded paper over the tractor drive pins 14.

Figure 3:
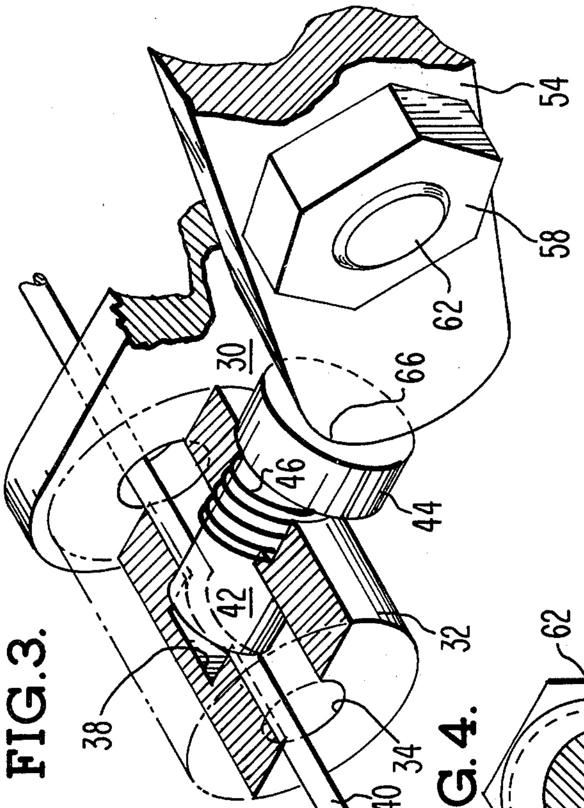
FIG. 3 is a greatly enlarged partial perspective view of a portion of the locking mechanism of FIG. 1.
Figure 4:
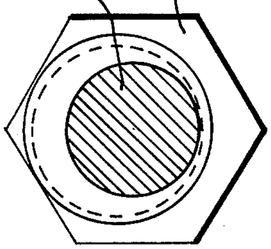
FIG. 4 is an enlarged end view of the eccentric element of FIGS. 1-3 inclusive.
Figure 2:
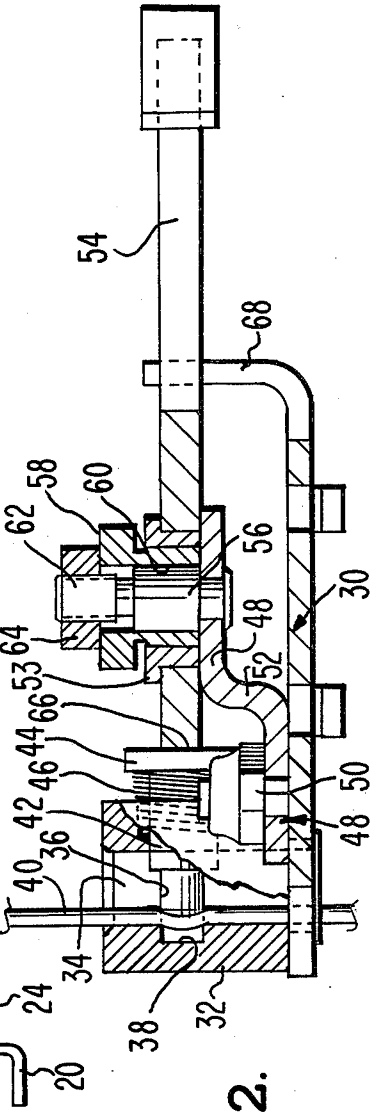
FIG. 2 is a cross sectional view along the line 2—2 of FIG. 1.

Adjustably secured to the tractor body 18 as by bolts 28 is an outboard mounting plate 30. Press fitted into plate 30 is an enlarged bushing member 32 provided with a horizontal, cylindrical bore 34 extending from side to side therethrough. A vertical cylindrical bore 36, perpendicular to bore 34 extends into and through one portion of bushing member 32 terminating at a fixed distance (for example 0.002-0.004") below bore 34, dependent upon the characteristics of the guide element. A shallow bore undercut 38, as seen in FIGS. 2 and 3, is provided for purposes to be explained presently. An elongated, wire-like, guide element 40 (0.005 to 3/16" in diameter depending upon the required application) extends through bore 34 of bushing 32 as seen most clearly in FIGS. 2 and 3, for example.

A short plunger-like member 42 having an enlarged head or cap 44 is adapted to seat in the cylindrical bore 36 and is biased outwardly, away therefrom by means of a short spring 46 surrounding the shank of the plunger member 42.

As seen most clearly in FIG. 2, a T-shaped mounting bracket 48 is attached to mounting plate 30 by means of bolts 50. Bracket 48 is bent as at 52 to provide clearance and support for a bushing 53 which is press fitted to an elongated structural handling member 54. A short irregularly shaped dowel pin 56 supports an eccentric hexagonal nut 58 and extends through the bore 60 of nut 58 terminating in a threaded portion 62 which receives a tightening or fastening nut 64 thereover. Member 54, as can be seen, is pivotally movable about the bushing 53. The lower end of member 54 is arcuately shaped to provide a cam surface 66 engageable with the enlarged head portion 44 of member 42.

Rotation of member 54 about the pivot member 56 will cause the cam end 66 of member 54 to depress member 42 so that the lower end of member 42 engages the elongated member 40 and depresses member 40 into the shallow bore 38 a predetermined distance thus providing interference between the walls of the vertical bore and the opposite edges of the bore 38 (as seen in FIG. 2) effective to prevent movement of the tractor along member 40.

Eccentric nut 58 provides means for adjusting the space between the lower end of plunger 42 and the bottom of bore 38 so as to accommodate varying size and characteristics of the elongate members 40. The bent overtang 68 acts as a stop for the pivotal arcuate movement of handle 54.

What is claimed is:

1. A locking mechanism for securing paper driving apparatus to a semi-rigid positioning member comprising:

driving means for moving prepunched, edge perforated material along a fixed path;

means for adjustably positioning the driving means to engage the edge perforated material;

means for radially deforming a portion of the semi-rigid positioning member in an outward direction to lock the driving means in and release it from a desired location; and means for accommodating semi-rigid positioning members of various diameters.

2. The invention claimed in claim 1, wherein the means for radially deforming a portion of the semi-rigid positioning member in an outward direction comprises:

a pivotal, elongated, rigid lever having a radial end portion;

a follower engageable by the radial end portion of the pivotal, elongated, rigid lever; and a plunger member integral with the follower and slideable in response to the movement of the pivotal, elongated, rigid lever.

3. The invention claimed in claim 2, wherein the follower includes means for biasing the follower into a nonengaging condition relative to the semi-rigid positioning member.

4. The invention claimed in claim 3, wherein the means for accommodating semi-rigid positioning members of various diameters comprises:

a hollow cylindrical member having a smooth axial bore;

a cylindrical opening, extending normal to the smooth axial bore, into which the plunger member is slideable; and eccentric means for adjusting the slideable distance of the plunger member by varying the degree to which the pivotal, elongated, rigid lever engages the follower of the plunger member.

5. The invention claimed in claim 4, wherein the plunger member is slideable to radially deform a portion of the semi-rigid positioning member in an outward direction into the cylindrical opening extending normal to the smooth axial bore and lock the driving means at a desired location along the semi-rigid positioning member.

6. The invention claimed in claim 2, wherein the pivotal, elongated, rigid lever is rotatable from a locking position to a releasing position.

* * * * *